May 16, 1933. W. J. CROWELL, JR 1,909,254
FLOW METER AND METHOD OF APPLYING IT
Filed Dec. 16, 1926 2 Sheets-Sheet 2
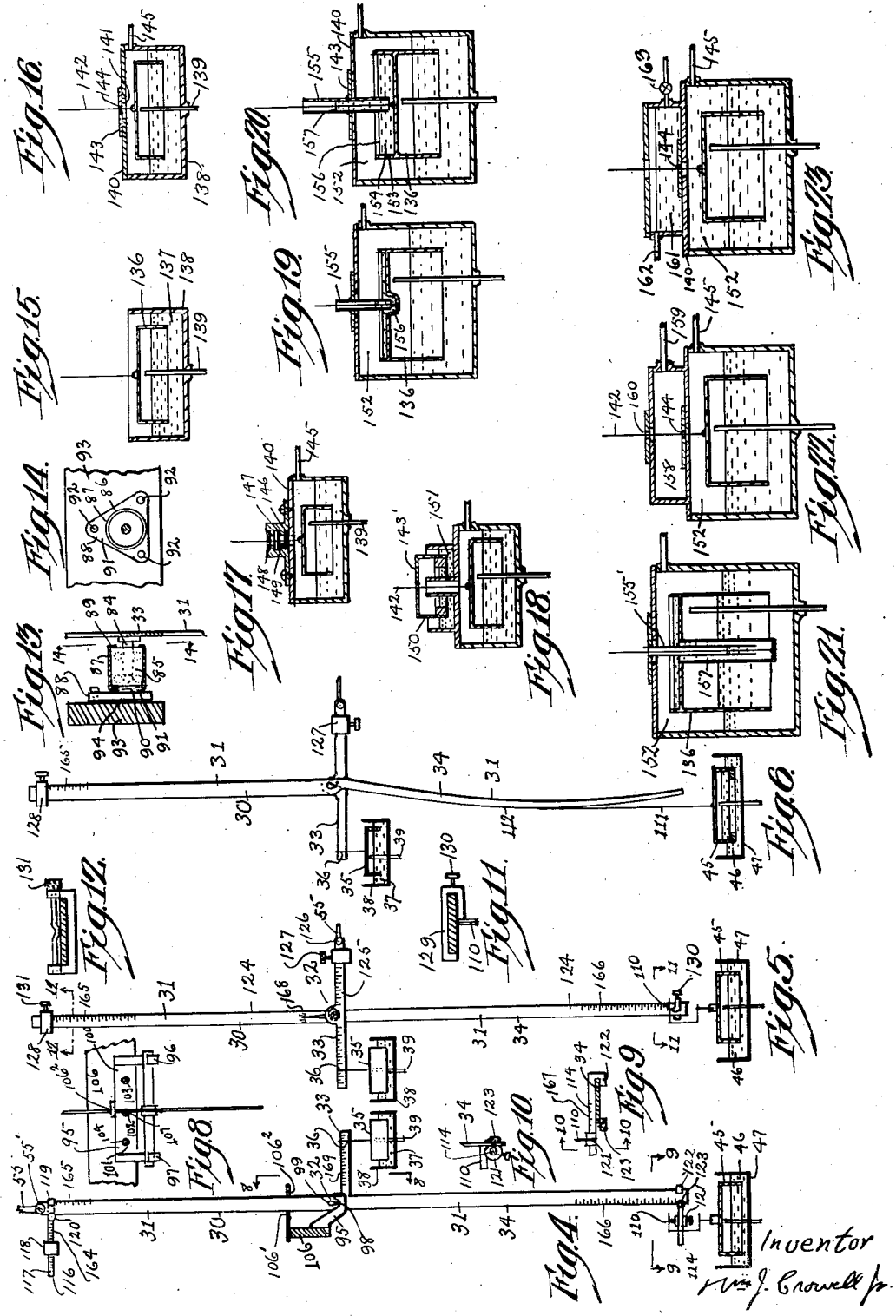

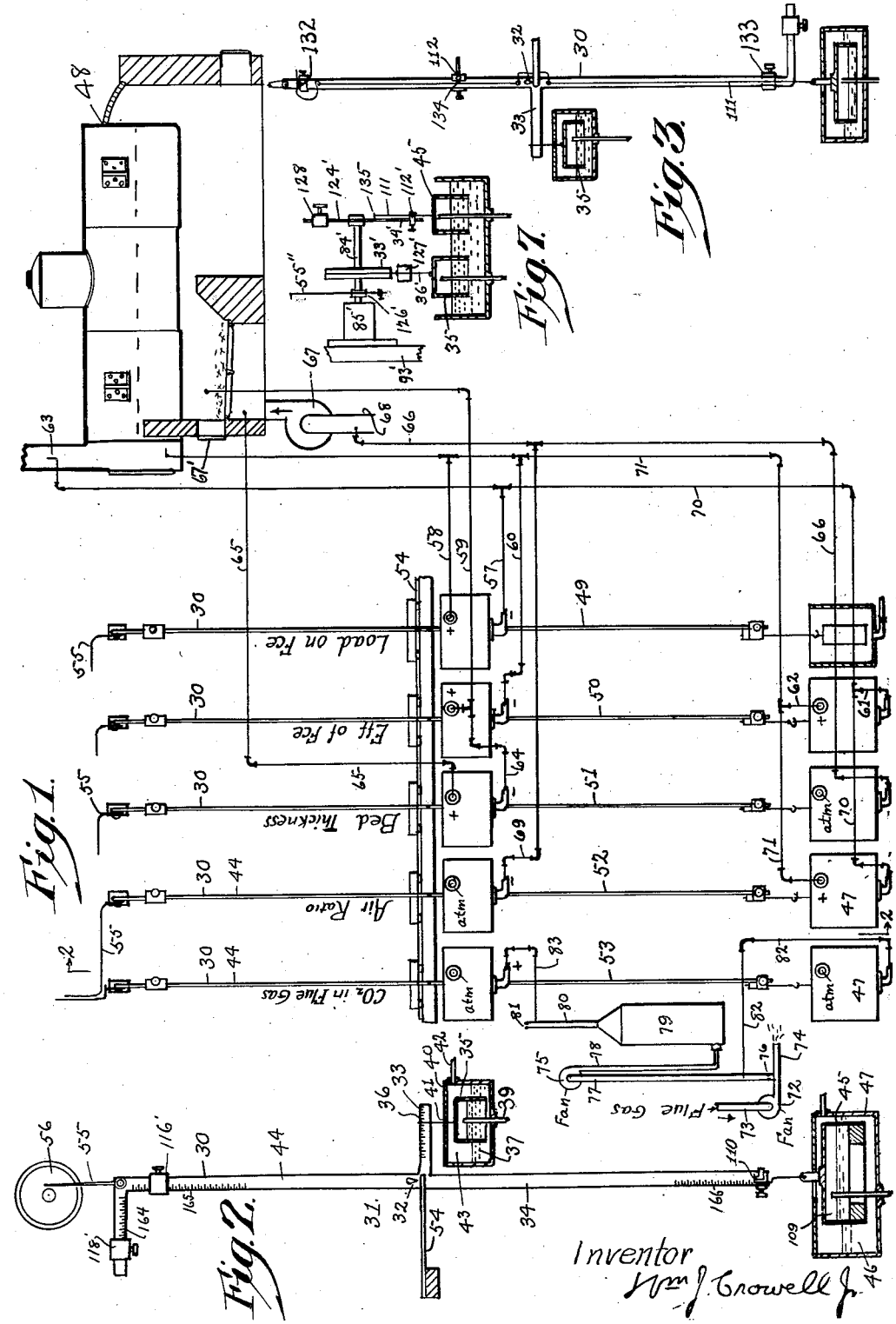

Patented May 16, 1933

1,909,254

UNITED STATES PATENT OFFICE

WILLIAM J. CROWELL, JR., OF WYNCOTE, PENNSYLVANIA

FLOW METER AND METHOD OF APPLYING IT

Application filed December 16, 1926. Serial No. 155,167.

My invention relates to flow metering devices and to a new application thereof. It is in part a development of the subject matter of my application for flow meter, filed April 19, 1926, Serial No. 81,637.

A purpose of my invention is to roughly indicate and record the efficiency of a boiler furnace by continuously indicating and recording the ratio between two differential pressures of which one is responsive to the temperature and flow of furnace gases in the furnace and the flues past the boiler and the other is responsive to the temperature and flow of waste gases from the furnace.

A further purpose is to roughly indicate and record the condition of the fuel bed of a furnace by continuously indicating and recording the ratio between two differential pressures, of which one is the fall in pressure through the fuel bed and the other is responsive to the flow of air through the bed.

A further purpose is to roughly indicate and record variations in the relative amounts of air entering a furnace at different points, or variations in the fractional portion of the total air that enters a furnace at a given point, by continuously indicating and recording the ratio between two differential pressures, one of which is responsive to the flow of air at the given point and the other of which is responsive to the flow of waste gases from the furnace.

A further purpose is to suspend a pair of cooperating inverted bells respectively from a lateral and a vertical arm of a horizontally pivoted balance, preferably counterweighting the assembly to be substantially angularly neutral throughout a given range of deflection when there are zero differential pressures upon the respective bells.

Optionally one or both or neither of the bells is weighted to be individually substantially vertically neutral with zero differential pressure.

A further purpose is to deflect a horizontally pivoted balance responsively to the ratio between two differential pressures by applying one of the differential pressures to the inside and outside of the upper portion of an inverted bell suspended from a lateral arm of the balance into a sealing liquid and the other differential pressure to the inside and outside of a second inverted bell suspended from a vertical arm of the balance into a sealing liquid.

A further purpose is to lessen the weight, and thereby lessen the pivotal friction and inertia, of a horizontally pivoted balance carrying inverted bells dipping into liquid respectively from horizontal and vertical arms, and counterweighted neutral, by locating the counterweighting far from the pivotal axis. The forces to be counterweighted are normally weights of the horizontal and vertical arms including any unfloated weight of either bell, and a slightly variant buoyancy of the bell on the horizontal arm due to variant depths of immersion at different angular positions of the balance.

A further purpose is to make range adjustment easy on a horizontally pivoted balance carrying inverted bells dipping into liquid respectively from horizontal and vertical arms. The balance is adapted to deflect responsively to the ratio between differential pressures applied at the respective bells and I provide for easily setting a given range of deflection of the balance to different predetermined ranges of ratios between the applied differential pressures. I make the initial position of the balance correspond to a ratio of zero or to a ratio of a predetermined value above zero as desired. Optionally the deflection is rectified, that is, made proportional to the square root of the ratios between the applied differential pressures.

A further purpose is to apply alternatively either pressure or suction underneath a bell carried on a lateral arm of a horizontally pivoted balance to deflect the balance in the same direction. I make the direction of movement of a recording pen the same when the deflecting differential is effectively suction under the bell as when it is pressure under the bell by laterally reversing the balance.

A further purpose is to avoid flow and any resultant temperature differentials in a pipe connection to the upper side of an inverted bell that dips into liquid within the lower portion of a substantially closed container and is suspended from a balance through an orifice in the top of the container. I may make the flow negligibly small by suspending through a succession of orifices, or prevent it altogether by suspending through a liquid seal or through an auxiliary chamber having a separate pipe connection to the source of pressure.

A further purpose is to suspend an inverted bell from a balance into a heavy liquid within the lower portion of a substantially closed container having an orifice to pass the suspension element, to make water pressure connections to the inside and outside of the upper portion of the bell, and to surround a portion of the suspension element above the orifice with water, preferably to a definite uniform depth.

Further purposes include providing a neutral balance with advantageous alternative pivoting, balancing and adjusting features.

Further purposes are included in the specification and in the claims.

I have elected to illustrate a few only of the many forms of my invention, selecting forms that are practical and efficient in operation and which well illustrate the principles involved.

Figure 1 is a diagrammatic view illustrating my invention applied to the furnace of a return tubular boiler to continuously record and indicate conditions of combustion with respect to furnace load, furnace efficiency, thickness of fuel bed, air ratio, and the $CO_2$ content of flue gases in the furnace, the view being partially diagrammatic.

Figure 2 is a section of Figure 1 taken upon the line 2—2 thereof.

Figures 3 to 7 are respectively side elevations of different forms of balance.

Figure 8 is an enlarged section taken upon the line 8—8 of Figure 4.

Figure 9 is an enlarged section taken upon the line 9—9 of Figure 4.

Figure 10 is a section upon the line 10—10 of Figure 9.

Figure 11 is a section taken upon the line 11—11 of Figure 5.

Figure 12 is an enlarged section upon the line 12—12 of Figure 5.

Figure 13 is a fragmentary elevation, partly in section, showing one form of pivot support.

Figure 14 is a section taken upon the line 14—14 of Figure 13.

Figures 15 to 23 are diagrammatic, fragmentary sectional elevations showing different forms of inverted bell generally applicable for use as either restoring or deflecting bells.

Like numerals refer to like parts in all figures.

Describing in illustration and not in limitation and referring to the figures:—

The differential balance units 30 shown are for use with low static pressure differentials and are each adapted to indicate and record either an individual differential pressure or the ratio between two differential pressures.

Each includes a beam 31, horizontally pivoted at 32 and having arms 33 and 34 substantially at right angles to one another and normally respectively approximately horizontal and vertical.

The horizontal or deflecting arm supports at a preferably adjustable distance from the pivot an inverted bell 35. This bell is the deflecting bell. It hangs from the arm 33 upon a suitable and preferably flexible suspension member 36 and dips into a sealing liquid 37 which is within the lower portion of a suitable stationary container 38.

The deflecting differential pressure is transmitted to the inside and outside of the upper portion of the bell.

A pipe 39 transmits one pressure to inside the bell above the liquid seal. The other pressure is frequently atmospheric and the top of the bell may then be open to the atmosphere,—as shown in Figures 4 to 6.

When the pressure above the bell is to be other than atmospheric, the container is provided with a lid 40 perforated at 41, to pass the suspension member, and a pressure pipe 42 transmits the second pressure to the space 43 within the container above the bell.

The opening to atmosphere around the suspension member is either made sufficiently small to make negligible any pressure effect at the bell due to leakage around the suspension or the opening is suitably sealed as explained later.

The vertical or restoring arm 34 extends downwardly from the pivot and exerts upon the balance a resistance to deflection that progressively increases with increasing deflection when the balance is used (as with the balance 49 of Figure 1) to measure an individual differential pressure applied at the deflecting bell, or that is simultaneously dependent upon both the magnitude of the deflection and upon the magnitude of the restoring differential pressure when the balance is used (as with the balances 50, 51, 52, or 53 of Figure 1) to measure the ratio between deflecting and restoring differentials.

The beam 31 carries a balancing arm 44 which preferably extends upwardly in line with the downwardly extending restoring arm and carries vertically and laterally adjustable counterweighting by which the beam may be adjusted to angular neutrality when it is to be used as a ratio meter or by which the center of gravity of the balance as a whole may be adjusted to points below the pivot to give any desired predetermined ratio between angular deflection of the balance and the applied deflecting differential pressure, which adapts the balance to measure an individual deflecting differential pressure.

The restoring bell 45 dips into a sealing liquid 46 held within a suitable container 47 and is usually suspended from the arm 34 at preferably adjustable vertical and horizontal distances from the pivot.

This adjustment permits the same range of angular deflection of the beam to correspond to widely different predetermined ranges of ratios. In practice this permits the balance to operate on any one of widely different ranges that may be found existent in different plants or in the same plant at different seasons or at different places. Adjustment is made so that the range of variation actually found to exist deflects the balance throughout its pen range.

Figure 1 illustrates somewhat diagrammatically a particularly valuable combination of multiple balances for continuously picturing the operation of a boiler furnace.

The furnace and boiler may be of any suitable type, the illustration of a typical return tubular boiler plant 48 being intended for a conventional illustration of any one of widely variant types of furnaces and boilers.

The balances 49, 50, 51, 52 and 53 are connected to give continuously respectively, a rough indication and record of furnace load, a rough indication and record of furnace efficiency, a rough indication and record of the condition of the fuel bed with respect to depth of bed and holes through the bed, a rough indication and record of the fractional portion of the air that enters the furnace as primary air, and an indication and record of the $CO_2$ content of the flue gas.

The balances are pivotally mounted in a row along a supporting stationary bearing member 54. Each balance carries a pen 55 adapted to record upon a suitable moving chart 56. Any desired number of the balances may record upon the same chart—or the balances may record upon individual charts according to personal preference.

Load on the furnace may be taken as roughly measured by a differential responsive to total flow and absolute temperature of flue gases,—as at the stack or across the boiler. In the illustration the balance 49 measuring furnace load is connected by pressure connections 57 and 58 to a suitable stack differential.

Furnace efficiency may be taken as roughly determined by the ratio between two differential pressures, of which the first is responsive to the flow and absolute temperature of the flue gases across the boiler and the second is responsive to the flow and absolute temperature of flue gases in the stack.

In the illustration opposite sides of the deflecting bell of the balance 50 are connected by pressure pipes 59 and 60 respectively into the furnace above the fuel bed and into the flue after the boiler, and opposite sides of the restoring bell of the balance are connected by pipes 61 and 62 respectively to a pitot 63 pointing up the stack and into the flue after the boiler.

While this ratio is doubtless not actually proportional to furnace efficiency, the ratio is generally raised by any air adjustment that raises furnace efficiency and, vice versa, is lowered by any air adjustment that lowers boiler efficiency.

Thus if conditions are right for best efficiency and then changed by reducing the air, the temperature in the furnace and through a greater portion of the boiler will be lowered by incomplete combustion, the temperature in the stack gases raised by delayed combustion, and there will be a resultant reduction in the ratio taken to indicate furnace efficiency.

On the other hand if the requisite air is increased beyond its best value, it will be a mere diluent and again the result will be a fall in the ratio taken to roughly show furnace efficiency.

The balance will have its maximum reading when the air adjustment is that for most efficient combustion. The effect of change in the heat absorbing characteristics of the boiler incident to change in the cleanliness or dirtiness of the heat absorbing surfaces is such that a gradual dirtying of the heat absorbing surfaces will result in a gradual fall of the indication of the balance, and that cleaning the boiler inside or outside will result in a correspondingly higher indication of the balance.

It will be thus seen that a gradual falling record will indicate a gradual dirtying of the heat absorbing surfaces.

It will be understood that each ratio balance 50 to 53 deflects as a determinative function of the ratio between the two applied differential pressures with either of the two pressures connected into the upper bell while the other is connected into the lower bell, a reversal of the upper and lower connections requiring a suitable change in the scale of deflection, there being a reciprocal relationship between the said scales.

The condition of the fuel bed, with respect to the thickness of bed and to holes is shown by the ratio of the fall in pressure across the fuel bed to a differential responsive to primary air, and the deflecting bell of the balance 51 receives the differential through the fuel bed by the pressure pipes 64 and 65; and the restoring bell of the balance receives a suction by the pressure pipe 66 that is responsive to the flow of primary air.

In the illustration the primary air is delivered to the space beneath the grate by a fan 67, a variant quantity of secondary air entering the furnace through the door 67' or at any other suitable opening to the space above the grate. The pipe 66 makes pressure connection into the inlet pipe 68 of the fan.

The indication of the balance 51 measures the resistance of the fuel bed to the primary air. When the bed is even the indication of the balance corresponds approximately to the depth of bed. Holes in the bed show up by an immediate drop in the indication of the balance.

The balance 52 is connected to roughly indicate variations in the relative proportion of primary and secondary air. The flow up the stack is normally roughly proportional to the total air entering the furnace so that the ratio between a differential responsive to the flow of primary air and a differential responsive to flow of stack gases may be considered as giving a rough indication of the relative quantities of primary and secondary airs, or as giving the primary air as a fractional portion of the total air.

The deflecting bell of the balance 52 is connected by pipe 69 to the inlet 68 of the fan, and opposite sides of the restoring bell are connected by pipes 70 and 71 respectively to the stack pitot 63 and to the furnace flue after the boiler, desirably as a velocity tube pointing into the gases issuing from the boiler flues.

The balance 53 is connected to continuously indicate and record the ratio between a differential pressure responsive to a small flow of flue gas after it has been passed through caustic potash and a differential responsive to the same flow before it passes through the caustic absorber.

A small fan 72 draws a strong stream of flue gas through a pipe 73 which connects to the furnace at any desired point, not shown.

The fan 72 delivers the greater portion of its flue gas to atmosphere through a relatively large outlet pipe 74, and the pipe 74 is sufficiently large that the pressure along its length is sensibly atmospheric. It is not large enough however to permit air to strike back along the pipe against the outward flow of the flue gas to atmospheric discharge.

A second fan 75 draws a sample for continuous analysis from the pipe 74 through a tiny orifice 76 and pipe 77 and discharges it through pipe 78, absorbing chamber 79, pipe 80 and orifice 81 to atmosphere.

Suction connection 82 is made between the pipe 77 after the orifice 76 and the restoring bell of the balance 53 and pressure connection 83 is made from the pipe 80 before the orifice 81 to the deflecting bell of the balance 53.

It will be seen there is atmospheric pressure before the orifice 76 and after the orifice 81 so that each orifice requires but a single pressure connection.

The scale on the chart may be made such that the reading of the balance is in $CO_2$ content of the sample, the balance 53 being then set to indicate zero when the sample stream sent through the orifices 76 and 81 and the intermediate absorber 79 is air containing no $CO_2$.

Figures 4 and 8 illustrate a desirable form of supporting bracket bearing for knife-edge pivots.

The bracket 95 is of the U-type and extends diagonally downward at 96 and 97 to present concave bearing surfaces 98 to receive the knife edges 99. These bearing surfaces are desirably arcuate recesses. The face 100 of the bracket is provided with preferably three perforations 101, 102 and 103. The outer holes 101 and 103 receive non-circular or eccentric angularly adjustable members 104 mounted on the stationary supporting structure 106 for vertical angular adjustment of the bracket and the middle hole receives a bolt or screw 107 having a head (not shown) large enough to clamp the bracket to the stationary supporting structure and a body smaller than the hole 102 and threaded into the support 106.

This arrangement permits slight universal adjustment of the bracket with respect to the bolt by means of adjustment of one or both of the eccentrics. Angular alinement is effected by proper adjustment of one or both of the eccentrics.

Details of the balance

I prefer, usually, to use a knife-edge pivot (Figures 1 to 6). In certain circumstances it may be preferable to use a ball bearing type of pivot. The knife-edge pivot when properly made is more sensitive and very inexpensive, but when the operating conditions include considerable plant vibration the balance will find its correct reading equally well with a ball bearing pivot and a greater definiteness of axial position makes the ball bearing pivot then advantageous (Figures 7 and 13 and 14).

In Figures 13 and 14 the beam 31 carries a lateral mandrel shaft 84 which is received in the inner rotatable race member of a ball bearing unit 85.

The ball bearing unit may be of standard commercial type and is removably mounted in a union bracket member 86. This member comprises a sleeve 87 and cooperating bracket member 88. The sleeve fits the outside circumference and flanges radially inwardly at 89 over the outer end of the ball bearing unit. At its inner end it threads upon a projecting threaded boss 90 of the bracket to clamp the ball bearing unit rigidly to place.

The bracket is flanged at 91 and the flange is bolted at three points 92 to stationary supporting structure 93, preferably riding on a small intermediate projection 94 to permit easy alinement by slight adjustment of the bolts or screws at 92.

Support of restoring bell

The restoring bell 45 is suspended in a way that adapts it to exert a progressively increasing restoring moment upon the beam 34 as the angular deflection of the beam increases.

The bell may be suspended in different ways according to circumstance, preferably being suspended from the deflecting beam but optionally is suspended from a fixed point not on the balance.

In Figures 2, 4 and 5 the bell is suspended from a knife-edge 110 that is parallel to the pivotal axis of the balance, carried by the deflecting arm 34 and preferably adjustable vertically and laterally with respect to the pivoted axis of the balance.

This vertical and lateral adjustment permits accommodating the balance to different ranges of ratios for the same range of angular deflection and therefore for the same range of pen deflection.

In Figure 3 the bell is suspended by a flexible member 111 suitably fastened to the beam above a laterally directed knife edge or pin 134 carried by the beam. The member 134 is preferably adjustable horizontally and vertically with respect to the pivot 32, the vertical adjustment varying the arm of the restoring moment for a given angular deflection of the balance and the horizontal adjustment permitting setting of the moment to zero for any one of slightly variant vertical positions of the beam, as described later in greater detail.

In Figure 6 the flexible suspension member 111 is fastened to the beam at or near the pivotal axis of the balance and engages variant portions of a convexly curved cam surface 112 according to the extent of angular deflection of the balance.

The cam surface is normally formed to vary the effective lateral distance between the pivotal axis of the balance and the vertical portion of the suspension member, proportionally to the square of the angular deflection of the balance. This makes the angular deflection of the balance proportional to the ratio between the two flows producing the impressed differential pressures instead of substantially directly proportional to the two impressed differential pressures.

Let $A_1$, $H_1$ and $a_1$ equal respectively the sectional area of the deflecting bell, the impressed deflecting differential and the lateral distance between the pivotal axis and the suspension of the deflecting bell;

Let $A_2$, $H_2$ and $a_2$ equal respectively the sectional area of the restoring bell, the suction under the restoring bell and the vertical distance between the pivotal axis and the point of suspension of the restoring bell;

Let the balance be set angularly neutral when both impressed differentials are zero.

Let B equal the angle of deflection under the impressed differentials of $H_1$ and $H_2$, it being the angular distance the point of suspension of the restoring bell is away from a position vertically beneath the pivotal axis.

Then the deflecting moment equals $H_1 A_1 a_1 \cos B$ and the balancing restoring moment equals $H_2 A_2 a_2 \cos B \sin B$, from which $H_1/H_2$, which is the ratio between the impressed differentials, is equal to $\sin B \, (A_2 a_2)/(A_1 a_1)$ showing that the ratio of the impressed differentials varies directly as the sine of the angle of deflection.

I set the balance to any desired range by proper selection of the quantities $A_1$, $A_2$, $a_2$, $a_1$ and by selecting proper values of B for initial and maximum readings of the pen, limiting the motion of the balance to that which will deflect the pen over the range of its chart. I may limit the swing of the balance to the range on the chart by suitable stops 106' and 106² (Figures 4 and 8) fastened to supporting structure 106 and adapted to engage opposite sides of the balance respectively at the positions corresponding to maximum or minimum readings of the pen.

Preferably $a_1$, $a_2$, and the value of B corresponding to a minimum reading of the pen on the chart, which I will call $B_0$, are each adjustable.

$a_1$ is adjustable by laterally shifting the suspension point 36 along the arm 33.

$a_2$ is adjustable by vertically shifting the knife edge 110 along the vertical arm 34.

$B_0$ is adjusted by changing the relative angular positions of the pen and point of suspension of the restoring bell. This may involve a lateral shifting of the knife edge 110 along the preferably vertically adjustable rod 114 (Figure 4), or it may involve merely an angular adjustment of the pen arm at the screw 55' (Figure 4); or as indicated in Figures 5 and 6 the pen may be mounted on the horizontal or deflecting arm and $B_0$ adjusted by relative angular adjustment of the horizontal and vertical arms.

In Figure 4, the deflecting, restoring and balancing arms are relatively integral, together forming the integral beam 31. The pen arm 55 is fastened to the upper end of the balancing arm by a screw 55' at which the arm is angularly adjustable.

The balancing weighting 116 comprises a rod 117 and a weight 118 adjustable along the rod. The rod 117 hooks around the beam at 119 and is clamped to position by a screw 120 which threads laterally into the rod and has a head overlapping and clamping the face of the beam.

Upon loosening the screw 120 the rod 117 carrying the laterally adjustable weight 118 is vertically adjustable along the beam.

The knife edge 110 (Figures 4 and 9) is carried by a sleeve 121 which is adjustable along the rod 114. The rod 114 may be similar to the rod 117. It hooks around the arm 34 at 122 and is clamped at the other side of the arm 34 by the screw 123 threaded into the rod and overlapping the beam.

In the balance shown in Figure 5 the vertical and horizontal flat members 124 and 125 are clamped together angularly adjustably at the pivot 32 at intermediate points of both members.

The pen arm is fastened to the horizontal member at 126 and the range of movement of the horizontal member should therefore be substantially the same at any one of many different angular settings of the vertical arm.

The knife edge pivot is preferably rigidly fastened to the horizontal member and angularly adjustable with respect to the vertical arm so that its angular relation to its bearing surface may be unaffected by angular adjustment between the arms.

The weight for effecting a lateral balancing of the deflecting bell and deflecting arm is vertically near the pivot 32 in the form of Figure 5, at 127, which is less advantageous than balancing the lateral weights and forces high above the pivot, as in Figure 4.

When the lateral balancing is high above the pivot, as in Figure 4, the weight for lateral balancing is also effective for vertical balancing, and the total weight and resultant inertia and pivotal friction are relatively lower.

In the form of Figure 5, the knife edge 110 and its balancing weight 128 are both adjustable along the arm 124, respectively above and below the pivot. The sleeve 129 carrying the knife edge 110, and the balancing weight 128, will each slide freely along the arm 124 upon loosening the respective clamping screws 130 and 131.

The weight of the deflecting bell 35 may be balanced by a proper lateral weight adjustment,—adjustment of the weight 118 in Figure 4 or of the weight 127 in Figures 5 or 6.

When this is done the balance will operate with either suction or pressure under the deflecting bell. Suction will pull the bell downward and deflect in one direction, while pressure will overcome a portion of the weight of the bell permitting the balance to deflect in the other direction.

When there is effectively pressure under the deflecting bell, the bell may be weighted sufficiently to operate throughout the desired range.

The balance is laterally reversible so that deflection may be obtained in either direction by either suction or pressure under the deflecting bell. Placing of the supporting bracket 95 so that it extends diagonally downwardly from above leaves clearance room for turning the balance either way.

The weight of the restoring bell may also be balanced by proper vertical weight adjustment, as by properly locating the weighting 116 in Figure 4 or the weight 128 in Figures 5 or 6.

When the restoring bell is suspended from a point that may or may not be of the balance below the pivot 32, as in all the forms shown excepting that of Figure 3, the bell must be pulled downward by the differential. This means that there will normally be suction under the restoring bell.

In the form of Figure 3 the restoring bell is suspended from a point of the balance above the pivot at 132 and counterweighted below the pivot by the vertically adjustable weight 133.

In this arrangement the differential at the restoring bell tends to neutralize the weight of the bell by lifting the bell there being thus pressure under the bell.

Adjustment in the horizontal and vertical position of a knife edge or pin member 134 which presents its horizontal knife edge or pin surface to the suspension thread 111 is used to vary the range of ratios for a given pen range.

In all the forms shown the restoring moment will operate the same, whichever direction the balance is deflected, and the balance may be deflected in either direction by either pressure or suction upon the deflection bell according to which way the balance is turned laterally.

The lateral arm 33 in the forms of Figures 1 to 4 is integral with the body of the balance. This a very convenient arrangement, permitting as shown in Figure 4 easy universal adjustment with respect to range.

Alternatively the horizontal arm is made angularly adjustable with respect to the vertical arms as in Figures 5 and 6. In this event, it is best to balance each member separately so that change in angular adjustment of one member does not upset the balancing of the apparatus as a whole.

In Figure 7 the deflecting and restoring arms, 33' and 34' respectively are relatively spaced along a shaft 84' having roller bearing pivot support at 85'.

The deflecting arm 33' is a pulley fastened to the shaft 84'. The suspension 36' passes over the pulley and the weight of the deflecting bell 35 is balanced by a weight 127' hanging from the other side of the pulley.

The restoring arm 124' is also rigidly fastened to the shaft and may be generally similar to the member 124 of Figure 5.

The suspension thread 111' of the restoring bell 45 is fastened to a pin 135 in the arm 124' near the shaft and laterally engages a pin 112' adjustable along the arm 124'.

The pen arm 55'' is fastened to the shaft at 126'. It should be angularly adjustable and angularly balanced with respect to the shaft for easy range adjustment.

Restoring and deflecting bells

The inverted bells will desirably vary somewhat according to operating conditions and individual preference.

The arrangement shown in Figure 15 is suitable when there is atmospheric pressure above the bell and either pressure or suction below the bell. In very many cases this arrangement is all that is needed, a bell 136 being inverted into liquid 137 within a container 138. The bell is inverted over a pipe 139 through which the pressure or suction is applied.

Figure 16 shows a usual arrangement when the pressure above the bell is either somewhat above or somewhat below atmospheric pressure, and when a slight leakage of or into the operating fluid is immaterial.

The container 138 is provided with a cover 140 having an opening at 141 sufficiently large to avoid danger of engagement between the suspension thread 142 and the side of the opening.

A second plate 143 provided with a small perforation 144 just large enough to pass the thread is mounted above the cover and adjusted to proper position.

The area of the perforation 144 is relatively small compared to the area of the pipe 145 which brings the operating pressure or suction into the container, and there is effectively no fall in pressure within the region above the bell by reason of any slight leakage at the perforation 144.

The suspension of the deflecting bell has very little lateral movement and the perforation 144 may be round and quite small.

With the restoring bell the suspension is desirably a thin ribbon where it passes the perforation 144, and during deflection of the balance moves laterally in the direction of its width, the perforation being sufficiently long to accommodate the lateral movement of the suspension.

Optionally the orifice 144 may be made of size to fit the suspension and the plate let slide laterally with the suspension.

In the form shown in Figure 17 the cover 140 carries a succession of perforated plates, as 146, 147 and 148, which may or may not be slidable to accommodate lateral movement of the suspension.

The succession of orifices with intermediate spaces 149 will greatly reduce any leakage.

Ordinarily the arrangement of Figure 17 is not necessary, a small amount of leakage either in or out, usually making no difference in the pressure transmitted by the pipe 145.

It sometimes happens that what might be called false differentials result from difference in temperature in vertical runs of pressure pipes.

If the pipe 145 is connected into a flue containing a hot fluid at more than atmospheric pressure, any leakage around the suspension may be bad in that the hot fluid will continually slowly flow into the pipe and prevent it from attaining the atmospheric temperature. The other pressure connection being sealed under the bell has no such flow and soon attains atmospheric temperature, when a false differential may result from temperature differences in any vertical runs of the pipes.

In Figure 18 the friction between the orifice plate and the suspension is reduced by mounting the plate 143' as the top of an inverted bell 150 floating in suitable liquid 151. This arrangement ordinarily is not necessary though has advantages in the resultant extreme smallness of friction between the orifice plate and the suspension.

In Figures 19 to 21 the compartment 152 above the bell 136 is sealed from the atmosphere by suitable liquid, the suspension passing through the liquid seal.

In Figure 20 the inverted bell has sides extending upwardly to form a cup 153. This cup is charged with suitable liquid 154 into which dips a tube 155 carried by the plate 143 which is adjustably mounted upon the perforated cover 140.

The effectiveness of this arrangement to entirely avoid an error if the pressure within the compartment 152 fluctuates will depend upon the relative sectional areas of the surface 156 of the cup and the surface 157 of the tube 155. If the tube is fairly small and the cup is made the full area of the bell, any error due to a fluctuating variation from atmospheric pressure within the compartment 152 is negligibly small.

In Figure 19 the cup member is downwardly recessed at 156 to receive the lower end of the tube 155.

This lessens the requisite volume of the cup member without changing its action. It thus lessens the weight of liquid upon the bell which has to be supported by the balance, and, therefore, results in lower friction at the balance pivot, and lower inertia.

Figure 21 shows the inverted bell sealed from the atmosphere against suction within the compartment 152. Here the cup member carries a downwardly extending tube 157 to receive the relatively long downwardly extending tube 155' from the cover.

Usually there is no need for sealing a slight suction in the compartment 152 from the atmosphere, as a small inward leakage of air at the suspension normally makes no difference.

The arrangement shown in Figure 22 is a very desirable one when the pipe 145 is connected into a hot flue at more than atmosphere pressure, and effectively prevents any gradual flow in the pipe 145 incident to leakage at the suspension whether the pipe 145 and the compartment 152 are under pressure or suction.

The cover carries an auxiliary chamber 158 to which separate pressure connection is made at 159 from the source of pressure transmitted by the pipe 145. As a result the compartments 152 and 158 are at the same pressure and there is no flow through the intermediate orifice 144 passing the suspension 142, and therefore no flow along the pressure connection 145 from its source of pressure.

There will be some slight flow along the pressure connection 159 into the upper compartment due to leakage at an orifice 160 which passes the suspension through the top of the compartment, but any such flow does not affect conditions within the pipe 145 or affect the differential impressed upon the bell.

The arrangement shown in Figures 15 to 22 may be used with either liquid or gas differentials.

When used with gas the sealing liquids 137, 151, and 154 may be water or other suitable liquid.

If the differentials are water differentials, then the sealing liquid is one heavier than water such as carbon tetra chloride or mercury.

In general the seal is a liquid heavier than the fluid flowing to produce the differentials and preferably substantially insoluble with the fluid.

The arrangement shown in Figure 23 is the usual one for water differentials. If the water pressure transmitted from the pipe 145 is above atmospheric pressure leakage of water is through the orifice 144 into a compartment 161 above the cover 140. This leakage overflows to waste at a suitable pipe 162.

If there is suction in the compartment 152, the chamber 161 is kept full of water of which a small amount flows down through the orifice back through the pressure pipe 145. The make-up water is admitted into the compartment 161 through a suitable valve 163.

The balance is preferably provided with adjustment scales upon the respective arms along which there are longitudinal adjustments.

Thus, there is a scale 164 along the arm 117 of Figure 4 for use in positioning the weight 118, a scale 165 downwardly from the upper end of the beam for use in positioning the member 116 of Figure 4 and 128 of Figures 5 and 6.

Also there is a scale 166 upon the restoring arm for use in setting the vertical position of the knife edge 110, a scale 167 along the rod 114 for laterally positioning the knife edge 110 upon the rod 114, a scale 168 for angularly setting the deflecting and restoring arms of Figures 5 and 6, and a scale 169 along the respective deflecting arms for setting the effective length of the deflecting arm.

These scales make it very easy to quickly set the balance to any desired range of ratios when the balance is used to record ratios of differentials and to any desired range of differentials when it is used to record differentials.

A major portion of the heat generated during the burning of fuel should be removed or absorbed from the hot gases as these gases travel along heat absorbing surfaces presented by the boiler and that part of the path of the hot products of combustion intermediate the fuel bed and stack and along which the hot gases continuously give up heat usefully to heat absorbing surfaces I herein call the heat absorbing flue of the furnace.

It will be understood that in carrying out the main features of the invention, such as that providing a continuous indication of the effectiveness of combustion, the steps include determining the proper variant differential pressures and then displaying the ratio between the variant pressures, and that the "determination" of the pressures does not involve measuring the pressures but rather a selective locating of the pressure connections whereby the differential pressures variant from moment to moment are yet in view of furnace conditions broadly "determined" by the settling of the locations of the pressure connections.

The value of the indication of each balance is very largely dependent upon its association for observation by the observer with the indications of the other balances.

Thus the indication of the balance showing the condition of the fuel bed is to considerable extent meaningless unless the operator is able to see it associated with the indication of the balance showing furnace efficiency whereby he is able to see how each change in the fuel bed affects the operation of the furnace for good or bad.

In the same way the simultaneous display of the balance giving the air ratio is extremely important. Each change in the fuel effects a change in the air proportioning and by reason of the simultaneous association of the three indications, of respectively furnace efficiency, air ratio and condition of fuel bed the operator after each change in the fuel is able to adjust back the air proportioning to the same value or to a different value according to whichever produces most effective furnace operation, as indicated by the efficiency balance.

In the same way, after any change in the air ratio or/and any drop in the furnace efficiency (indicated on the appropriate balance or balances) the operator can easily and effectively correct or change the condition of the fuel bed to attain best efficiency, noting the results of each change simultaneously on the different balances.

One of the more important of the new results of my cooperating balances is the display of the indications in such close association that an operator can watch the effect of each adjustment, whether of air or in the condition of the fuel bed, simultaneously with respect to effectiveness of combustion, air ratio and condition of fuel bed.

It will be understood that the word "ratio" as used herein means a quotient between two quantities.

In view of my invention and disclosure variations and modifications to meet individual whim or particular need will doubtless become evident to others skilled in the art and I claim all such in so far as they fall within the reasonable spirit and scope of my invention.

Having thus described my invention what I claim as new and desire to secure by Letters Patent is:—

1. In indicating the effectiveness of heat delivery from a flow of hot gas having a path of flow along an initial portion of which the gas is already hot and along a later portion thereof the gas delivers heat, the method which consists in determining one differential pressure from points of the path respectively before and after the heat delivery and therefore responsive to both the rate of flow and to the rate of heat delivery, in determining a second differential pressure from points of the path both on the same side of the region of heat delivery and both beyond the heating of the gas and therefore responsive to the rate of flow and but little affected by variations in the rate of heat delivery, measure the ratio between the two said differential pressures, and in displaying a continuous indication of the ratio to roughly indicate the effectiveness of heat delivery.

2. In operating a furnace delivering its gaseous products through a heat absorbing flue and thence through a waste flue the novelty which consists in showing the operation of the furnace by determining a differential pressure comprising a fall in pressure along the heat-absorbing flue, by determining a differential pressure responsive to flow through the waste flue, by measuring the ratio between the two said differential pressures, and by displaying a continuous physical indication of the ratio.

3. In operating a furnace having air for combustion passing through a fuel bed the novelty which consists in determining a differential pressure comprising the fall in pressure through the bed, in determining a differential pressure produced by the air flowing to the fuel bed before it reaches the fuel bed and of magnitude roughly determined by the total weight of air passing through the fuel bed per second, in measuring the ratio between the two said differential pressures, and in displaying a continuous physical indication of the ratio to continuously indicate the condition of the bed.

4. In operating a furnace receiving a plurality of flows of inlet air, the novelty which consists in determining a differential pressure determinatively responsive to the rate of one of the flows irrespective of any variation in flow resistance at any grate of the furnace, in determining a second differential pressure of magnitude having a roughly determinative relationship with the sum of the flows, measuring the ratio between the two said differential pressures, and in displaying a continuous physical indication of the ratio to indicate the relative proportioning of the flows.

5. In operating a furnace having a flow of outlet waste gases and a plurality of flows of inlet air, the novelty which consists in determining a differential pressure determinatively responsive to one of the flows of air irrespective of any variation in flow resistance at any grate of the furnace and having a magnitude in continuous roughly determinant relationship thereto, in determining a second differential pressure determinatively responsive to the flow of waste gases and roughly in determinative relationship with said flow of waste gases, measuring the ratio between the two said differential pressures, and in displaying a continuous physical indication of the ratio to indicate the relative proportioning of the air flows.

6. In operating a furnace having a plurality of flows of inlet air and delivering its gaseous products through a heat absorbing flue and thence through a waste flue, the novelty which consists in determining a differential pressure comprising a drop in pressure along the heat absorbing flue, in determining a differential pressure responsive to flow through the waste flue, in measuring the ratio between the two said differential pressures, in displaying a continuous physical indication of the ratio to indicate the effectiveness of furnace operation and the effect thereon of varying the relative magnitudes of the said flows of inlet air, in determining a differential pressure determinatively responsive to one of the flows of air, in determining a differential pressure incident to flow through the waste flue, in measuring the ratio between the last two said differential pressures, and in displaying near the first display a continuous physical indication of the said last ratio to indicate the relative proportioning of the air flows whereby an operator may adjust the proportioning of the air flows for maximum effectiveness of furnace operation as determined by the effect of such adjustment on the first display.

7. In operating a furnace having air for combustion passing through a fuel bed and the products of combustion passing through a heat absorbing flue and thence through a waste flue, the method of indicating operating conditions within the furnace which consists in determining a differential pressure comprising the fall in pressure through the fuel bed, in determining a differential pressure determinatively responsive to air flow through the fuel bed irrespective of any variation in flow resistance at the fuel bed, in measuring the ratio between the two said differential pressures, in displaying a continuous physical indication of the ratio to indicate the condition of the fuel bed, in determining a differential pressure comprising a fall in pressure along the heat absorbing flue, in determining a differential pressure determinatively responsive to and having a substantially determinative relationship with the flow of gases in the waste flue, in measuring the ratio between the last two said differential pressures, and in displaying near the first display a continuous physical indication of the said last ratio to indicate the effectiveness of furnace operation whereby an operator may adjust his fuel bed for maximum effectiveness of furnace operation as determined by the effect of such adjustment on the last display.

8. In operating a furnace having a plurality of flows of air for combustion, one of said flows passing through a fuel bed and the products of combustion passing through a waste flue, the method of indicating operating conditions within the furnace which consists in determining a differential pressure comprising the fall in pressure through the fuel bed, in determining a differential pressure determinatively responsive to the said one flow irrespective of any variation in flow resistance at the fuel bed, in measuring the ratio between the two said differential pressures, in displaying a continuous physical indication of the ratio to indicate the condition of the fuel bed, in determining a differential pressure determinatively responsive to the said air flow through the fuel bed, in determining a differential pressure determinatively responsive to the flow of waste gases, in measuring the ratio between the last two said differential pressures, and in displaying near the first display a continuous physical indication of the said last ratio to indicate the proportion of air flowing through the fuel bed whereby an operator may adjust the proportioning of the air flows as determined by the said last display to the condition of the fuel bed as determined by the first display.

9. In operating a furnace having a plurality of flows of air for combustion, one of said flows passing through a fuel bed and the products of combustion passing through a heat-absorbing flue and thence through a waste flue, the method of indicating operating conditions within the furnace which consists in determining two differential pressures of which one comprises a fall in pressure beyond the fuel bed along the heat absorbing flue and the other a differential pressure determinatively responsive to flow through the waste flue, in measuring the ratio between the two said differential pressures, in displaying a continuous physical indication of the ratio to indicate the effectiveness of furnace operation, in determining two other differential pressures of which one comprises a fall in pressure through the fuel bed and the second comprises a differential pressure determinatively responsive irrespective of flow resistance of the fuel bed to the air entering through the fuel bed, in measuring the ratio between the said two other differential pressures, in displaying near the first display a continuous physical indication of the said second ratio, to indicate the condition of the fuel bed whereby an operator may adjust the condition of the fuel bed as determined by the second display to give maximum effectiveness of furnace operation as determined by the first display, in determining two still other differential pressures of which one comprises a differential pressure determinatively responsive to the flow of air to the fuel bed and the other a differential pressure determinatively responsive to the flow of gases in the waste flue, in measuring the ratio between the said two still other differential pressures, and in displaying near the two first displays a continuous physical indication of the said third ratio to indicate near the other displays the proportion of air flowing through the fuel bed whereby for a given condition of fuel bed as determined by the second display the air proportioning as determined by the third display may be adjusted to secure maximum furnace effectiveness as determined by the first display.

10. In heating equipment, a furnace and a heat-absorbing flue for the gaseous combustion products thereof, in combination with a ratio differential balance adapted to show the ratio between impressed differential pressures, and differential pressure connections thereto adapting the balance to deflect in accord with the ratio between two differential pressures of which one is a fall in pressure along the heat-absorbing flue and the other is a differential pressure determinatively responsive to the total flow of gases through the furnace.

11. In heating equipment, a furnace, a heat-absorbing flue for the combustion products thereof, and a waste gas flue thereafter, in combination with a ratio differential balance adapted to show the ratio between two impressed differential pressures, and differential pressure connections thereto from the flues adapting the balance to deflect in accord with the ratio between two differentials of which one is fall in pressure along the heat-absorbing flue and the other is adapted to roughly measure the flow of waste gases from the furnace.

12. In heating equipment, a furnace having a fuel bed, and an air inlet conduit thereto, in combination with a ratio differential balance adapted to show the ratio between two impressed differential pressures substantially irrespective of the variation in the magnitudes of the differential pressures, and differential pressure connections thereto adapting the balance to deflect in accord with the ratio between two differential pressures of which one is a fall in pressure through the bed and the other is determinatively responsive to the rate of air flow in the conduit.

13. In heating equipment, a furnace having a plurality of air inlets and a flue carrying waste gases, in combination with a ratio differential balance adapted to show the ratio between two impressed differential pressures, and differential pressure connections thereto adapting the balance to deflect in accord with the ratio between two differential pressures of which one is determinatively responsive to the rate of air flow through one of the inlets and the other is determinatively responsive to the rate of flow of waste gases.

14. In heating equipment, a furnace having a fuel bed, an air inlet thereto and a heat absorbing flue for the gaseous products of the furnace, in combination with two or more ratio differential balances located to display to an operator the indications of all balances simultaneously and near together for association observation, pressure connections adapting one of the balances to deflect according to the ratio between two differential pressures of which one is a fall in pressure along the heat absorbing flue and the other a differential pressure determinatively responsive to the rate of flow of waste gases from the furnace, and other pressure connections adapting another balance to deflect in accord with the ratio of two differential pressures of which one is fall in pressure through the fuel bed and the second is determinatively responsive to the rate of flow of the air flowing through the fuel.

15. In a heating equipment, a furnace having a fuel bed, an air inlet thereto, a waste gas flue, in combination with two or more ratio differential balances located to display to an operator the indications of all balances simultaneously and near together for association observation, and connections thereto adapting one balance to deflect according to the ratio between two differential pressures that are respectively a fall in pressure through the fuel bed and one determinatively responsive to the rate of flow of air through the fuel bed, and adapting another balance to deflect according to the ratio between differential pressures that are respectively determinatively responsive to a flow of air into the furnace and the flow of waste gases from the furnace.

16. In a heating equipment, a furnace, a plurality of air inlets thereto, a heat absorbing flue carrying the gaseous products of the furnace, and a waste flue, in combination with two or more ratio differential balances located to display to an operator the indications of all balances near together for association observation, pressure connections adapting one of the balances to deflect according to the ratio between two differential pressures of which one is fall in pressure along the heat absorbing flue and the other is determinatively responsive to the rate of flow of waste gases, and other pressure connections adapting another balance to deflect according to the ratio between two differential pressures of which one is determinatively responsive to the rate of flow of air through one of the inlets and the other is determinatively responsive to the rate of flow of waste gases.

17. A furnace, a differential pressure balance having a horizontal pivot support, a restoring arm extending downwardly from said pivot support, a deflecting arm extending laterally from the pivot support, inverted bells, means for suspending one of said bells from each arm, a liquid seal for each bell, a support for each seal, and pressure connections from different portions of the furnace into the respective bells above the sealing liquids, in combination with counterweighting adapting the balance to substantial neutrality in its range of deflection when there are zero differential pressures at the respective bells.

18. A furnace, a differential pressure balance having a horizontal pivot support, a restoring arm extending downwardly from said pivot support, a deflecting arm extending laterally from the pivot support, inverted bells, means for suspending one of said bells from each arm, a liquid seal for each bell, a support for each seal, pressure connections from different portions of the furnace to the respective bells, in combination with counterweighting upon the balance far from the pivot adapting the balance to substantial neutrality in its range of deflection when there are zero differential pressures upon the two bells.

19. A furnace, a differential pressure balance having a horizontal pivot support, a restoring arm extending downwardly from the pivot, a deflecting arm, extending laterally from the pivot, an inverted restoring bell, an inverted deflecting bell, a liquid seal for each bell, a support for each seal, supporting connections between the respective bells and the respective arms, differential pressure connections from different portions of the furnace to the respective bells, and means providing an adjustment of one of the supporting connections along its arm, in combination with adjustable counterweighting upon the balance far from the pivot and on the other side thereof from said adjustment supporting connection adapting the balance to be set substantially angularly neutral in its range of deflection when there are zero differentials upon the two bells and for different settings of the balance with respect to range of differential ratios.

20. In furnace equipment, a beam, a pivot support therefor at an intermediate point thereof, a lateral arm adjacent the pivot and rigidly fastened to the beam, a deflecting bell, means for suspending the bell from the lateral arm, a restoring weight comprising a restoring bell suspended from and adjustable along one end of the beam, a liquid seal for each bell, a support for each seal, a counterweight for the restoring weight and carried by and adjustable along the other end of the beam, counterweighting for the lateral arm, and a pressure connection between the furnace and deflecting bell.

21. In furnace equipment, a beam, a pivot support therefor at an intermediate point thereof, a lateral arm adjacent the pivot and rigid with the beam, a deflecting bell, means suspending the bell from the lateral arm, an indicator carried by the beam, laterally extending rods, one toward each end of the beam, said rods extending from the beam on the side opposite the side from which the arm extends, said rods being in the plane of rotation of the beam, each rod being provided with means for adjustably supporting the respective rod on the beam, a weight comprising a restoring bell adjustably suspended along one of the rods, a counterweight adjustable along the other rod, a liquid seal for each bell, a support for each seal, and a pressure connection between the furnace and the deflecting bell.

22. In furnace equipment, a beam, a pivot support therefor at an intermediate point thereof, a lateral arm adjacent the pivot and rigid with the beam, a deflecting bell, means suspending the bell from the lateral arm and adjustable therealong, an indicator arm fastened to one end of the beam, a scale therefor, stops limiting the deflection of the balance to approximately the indicator scale, as determined by the position of the indicator thereon, laterally extending rods respectively toward the upper and lower ends of the beam, said rods extending from the beam on the side opposite the side from which the arm extends, a weight comprising a restoring bell adjustably suspended along the lower rod, a weight adjustable along the upper rod, a liquid seal for each bell, a support for each seal, and pressure connections between the furnace and the respective bells.

23. In furnace equipment, an upwardly and downwardly extending beam, a pivot support therefor at an intermediate point thereof, a lateral arm adjacent the pivot and operating rigid with the beam, a deflecting bell, means suspending the bell from the arm, a restoring bell suspended from the beam near one end thereof, a pen deflecting with the beam, a chart for the pen, a counterweight for the restoring bell, stops limiting the deflection to the range of registry of the pen and chart, means for effecting an adjustment in the relative angular positions of the pen, means for varying the point of suspension of the restoring bell with respect to the pivot, and pressure connections from different portions of the furnace to the respective bells.

24. In furnace equipment, a horizontally pivoted balance, an inverted bell, a liquid seal for the bell, and a suspension element between the balance and bell, in combination with a pressure chamber container of the liquid and of the bell, a lid for the container having a compartment perforated vertically to pass the suspension element, a pressure connection from one portion of the furnace to inside the bell, and separate pressure connections from another portion of the furnace respectively into the compartment and into the container above the liquid seal.

25. In furnace equipment, a horizontally pivoted balance, an inverted bell, a liquid seal for the bell, and a suspension element between the balance and bell, in combination with a pressure chamber container of the liquid and of the bell, a lid for the container having a compartment perforated top and bottom to pass the suspension element, movable orifice plates, one over and partially closing each perforation, each plate having a relatively small orifice registering with and passing the suspension element, a pressure connection from one portion of the furnace to inside the bell, and separate pressure connections from another portion of the furnace respectively into the compartment and into the container above the liquid seal.

26. In furnace equipment, a horizontally pivoted balance, an inverted bell, a liquid seal for the bell, a suspension element between the bell and balance, a pressure chamber container of the sealing liquid and of the bell, pressure connections from different portions of the furnace into the container respectively to inside and outside of the bell above the seal, and a lid for the container perforated to pass the suspension element, in combination with a seal around the suspension element at the perforation comprising a tube surrounding the suspension, carried by the lid, and extending downwardly into the container, an upwardly extending wall on the bell forming a cup around the tube, and a liquid in the cup sealing the bottom of the tube.

27. In furnace equipment, a horizontally pivoted balance, an inverted bell, a liquid seal for the bell, said bell having a top centrally depressed, a suspension element between the balance and the bell at the bottom of the depression, a tube surrounding the suspension element and dipping into the depression, an upwardly extending wall on the bell forming a cup around the depression, a pressure chamber container of the sealing liquid and of the bell having a cover supporting and sealing against the tube, a liquid seal in the cup and pressure connections from the different portions of the furnace into the container to inside and outside of the bell.

28. In furnace equipment, a horizontally pivoted balance, an inverted bell, a liquid seal for the bell, a suspension element between the bell and balance, a pressure chamber container of the sealing liquid and of the bell, a lid thereof perforated to pass the suspension element, pressure connections from different portions of the furnace into the container to inside and outside of the bell, in combination with a tube surrounding the suspension element at the perforation and supported by and extending upwardly from the lid, a wall extending upwardly from the lid forming a cup around the tube, a sealing liquid in the cup, and a second inverted bell dipping into and floated by the sealing liquid in the cup and perforated to pass the suspension.

29. A furnace having air for combustion passing through a fuel bed and other air for combustion entering the furnace beyond the fuel bed and the products of combustion passing through a heat absorbing flue to a waste flue, in combination with three ratio differential balances having a common mount adapted to display to an operator the indications of all three balances near together for association observation, pressure connections adapting one of the balances to deflect according to the ratio between a drop in pressure along the heat absorbing flue and a differential pressure determinatively responsive to the rate of flow of waste gases, other pressure connections adapting one of the other balances to deflect in accord with the ratio between two differential pressures of which one is the drop in pressure through the fuel bed and the other is a differential pressure determinatively responsive to the rate of flow of the air of combustion passing through the fuel, and still other pressure connections adapting the third balance to deflect in accord with the ratio between two differential pressures of which one is a differential pressure determinatively responsive to the rate of one flow of air to the furnace and the other is determinatively responsive to the rate of the total flow of gases through the furnace.

30. A furnace and a differential pressure balance having a horizontal pivot support, a deflecting arm and a restoring arm, the said arms extending respectively laterally and downwardly from the pivot, in combination with an inverted bell having means whereby it is suspended from the deflecting arm at a point spaced along the arm from the pivot, a liquid seal for the bell, a support for the seal, a pressure connection from one portion of the furnace into the bell above the sealing liquid, a second inverted bell, a liquid seal for the second bell, a support for the second seal, a pressure connection from another portion of the furnace into the second bell, a third support, a suspension connection between the second bell and third support and adapted to be engaged and deflected by the restoring arm of the balance when the balance deflects on its pivot.

WILLIAM J. CROWELL, Jr.